(12) United States Patent
Vucurevich

(10) Patent No.: US 8,499,038 B1
(45) Date of Patent: Jul. 30, 2013

(54) METHOD AND MECHANISM FOR PERFORMING CLOUD IMAGE DISPLAY AND CAPTURE WITH MOBILE DEVICES

(75) Inventor: Ted Vucurevich, Los Gatos, CA (US)

(73) Assignee: Enconcert, Inc., Los Gatos, CA (US)

( * ) Notice: Subject to any disclaimer, the term of this patent is extended or adjusted under 35 U.S.C. 154(b) by 7 days.

(21) Appl. No.: 13/102,806

(22) Filed: May 6, 2011

Related U.S. Application Data

(60) Provisional application No. 61/332,522, filed on May 7, 2010, provisional application No. 61/332,490, filed on May 7, 2010.

(51) Int. Cl.
*G06F 15/16* (2006.01)
(52) U.S. Cl.
USPC .......................................... 709/204; 709/248
(58) Field of Classification Search
USPC ................................................ 709/204, 248
See application file for complete search history.

(56) References Cited

U.S. PATENT DOCUMENTS

| | | | |
|---|---|---|---|
| 7,542,073 B2 | 6/2009 | Li et al. | |
| 8,001,472 B2 * | 8/2011 | Gilley et al. | 715/716 |
| 8,135,413 B2 * | 3/2012 | Dupray | 455/456.1 |
| 8,135,635 B2 * | 3/2012 | Molotsi et al. | 705/32 |
| 2002/0080721 A1 | 6/2002 | Tobagi et al. | |
| 2006/0031126 A1 | 2/2006 | Ma et al. | |
| 2007/0299976 A1 | 12/2007 | Zafar et al. | |

OTHER PUBLICATIONS

D.L. Mills, "Network Time Protocol (NTP)", M/A-COM Linkabit, Network Working Group, RFC 958, Sep. 1985, 14 pages.
David W. Allan et al., "The Science of Timekeeping, Application Note 1289" Hewlett-Packard Company, Jun. 1997, 87 pages.
Mark Martinec, "Time with Focus on NTP and Slovenia" Mar. 21, 2000, 35 pages.
D.L. Mills, "Internet Time Synchronization", IEEE Transactions on Communication, vol. 39, Issue 10, Oct. 1991, 12 pages.
David L. Mills, "Modelling and Analysis of Computer Network Clocks", University of Delaware, Electrical Engineering Department, Technical Report 92-5-2, May 1992, 31 pages.
U.S. Appl. No. 13/102,794, filed May 6, 2011, Entitled "Method and Mechanism for Coordinated Capture and Organization of Multimedia Data", 33 pages.
Non-final Office Action dated Apr. 12, 2013, for U.S. Appl. No. 13/524,365.

\* cited by examiner

*Primary Examiner* — Kristie Shingles
(74) *Attorney, Agent, or Firm* — Vista IP Law Group, LLP

(57) ABSTRACT

Disclosed is an improved approach for implementing participatory interaction at events using mobile devices. One approach is to utilize distributed display screens for the mobile devices in an audience to display a much larger collective image. Another approach is to utilize the distributed cameras of mobile devices in an audience to form a massive capture device from the different locations and perspectives of the audience members. Yet another approach is directed to the use of mobile devices in the audience to capture motion events among the audience, which are then used to synthesize new media items and types for the event.

18 Claims, 17 Drawing Sheets

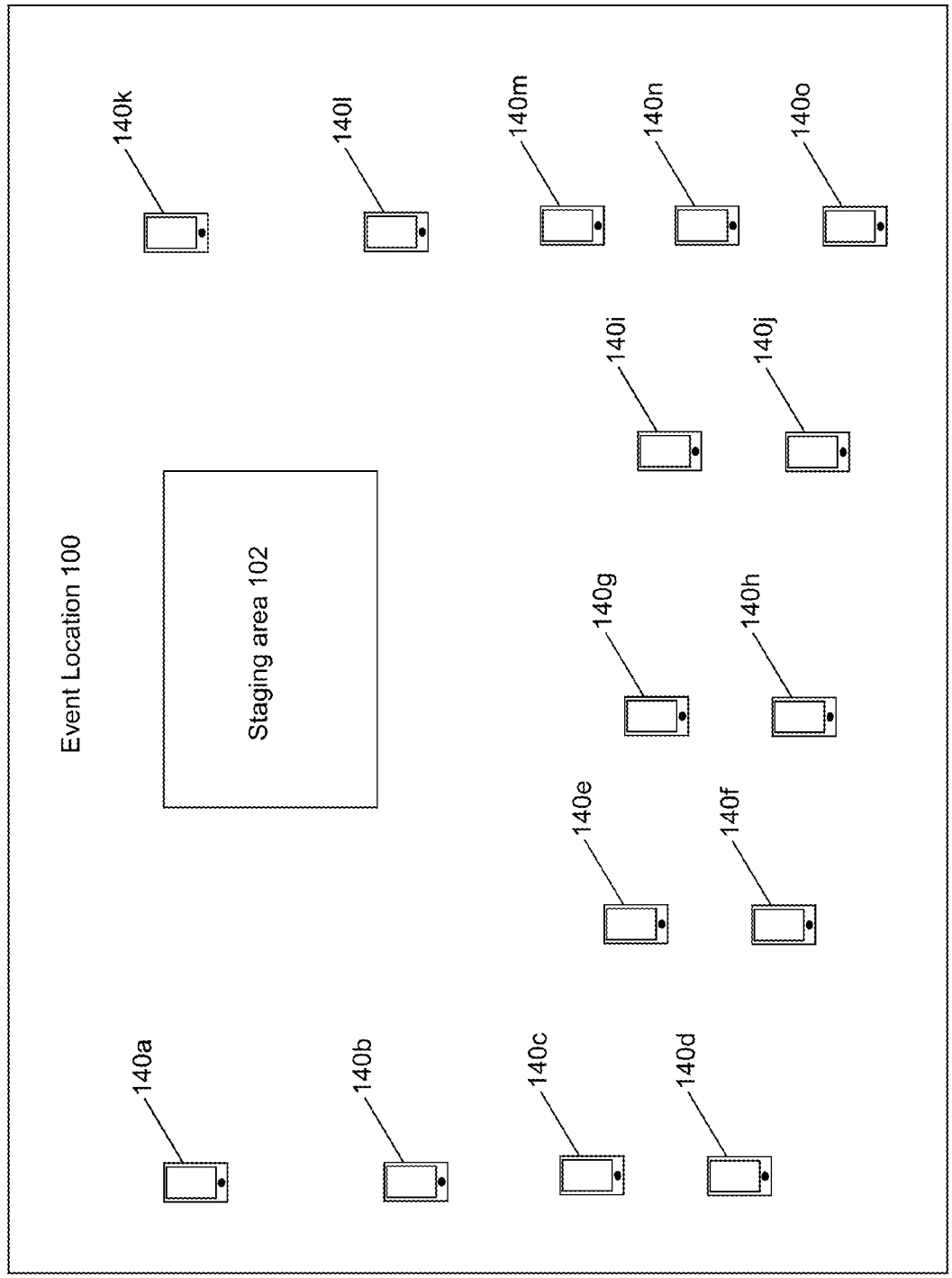

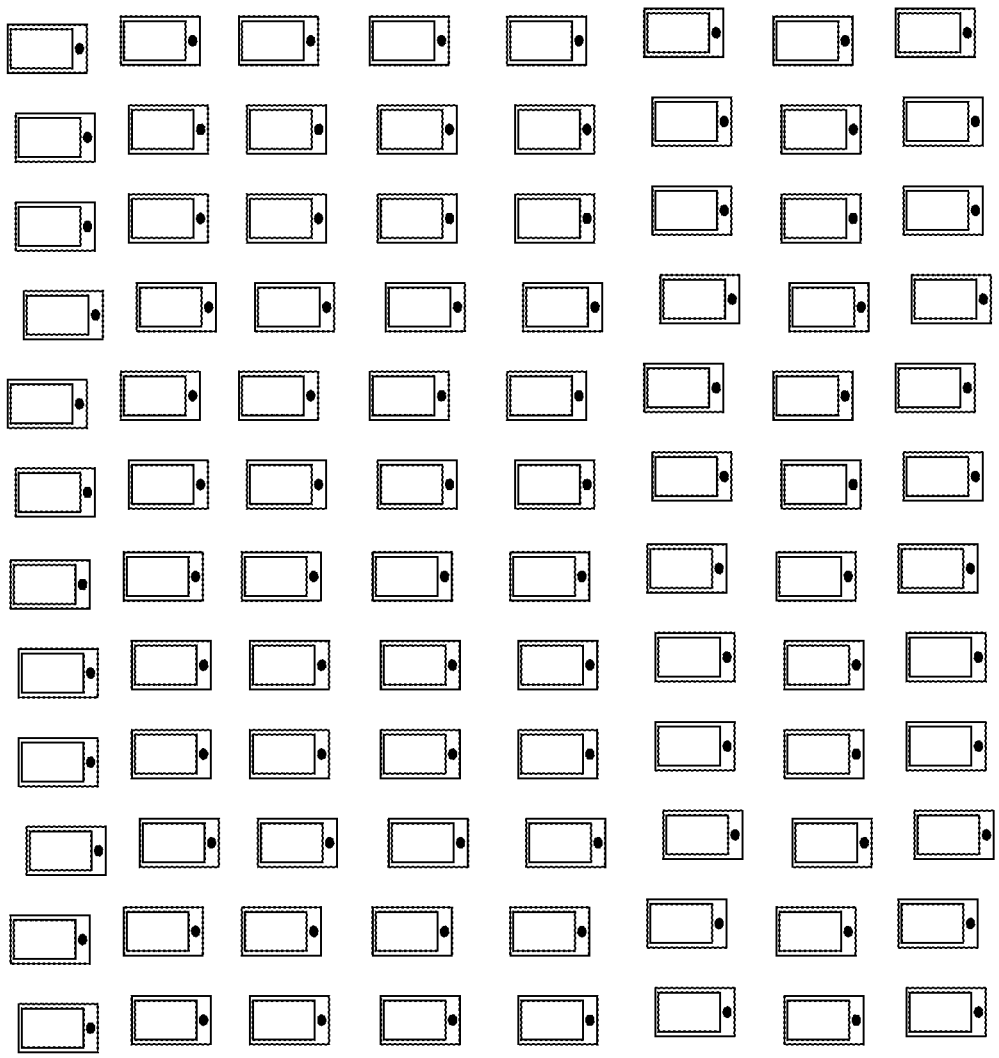

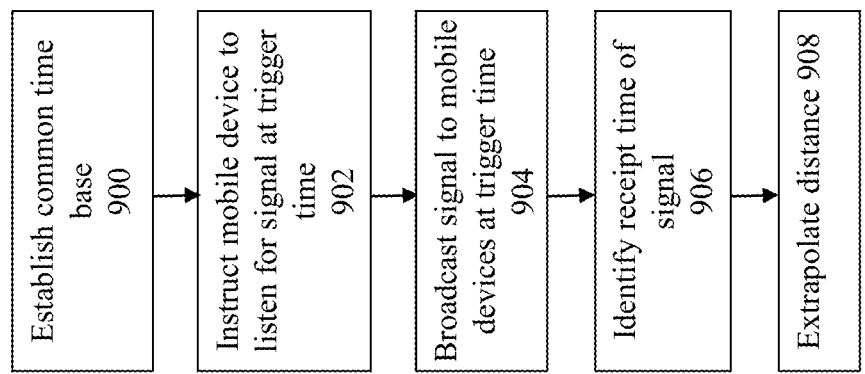

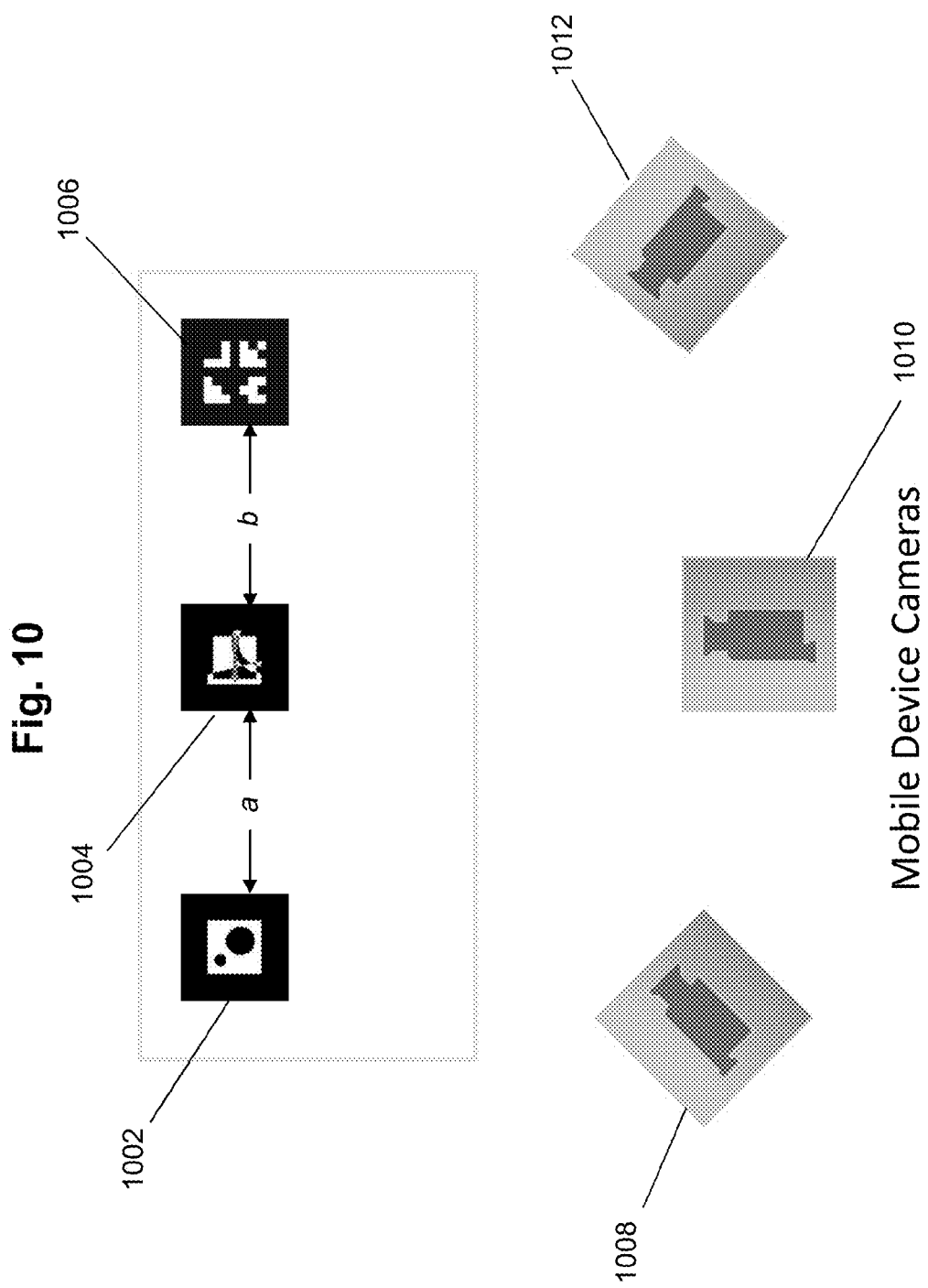

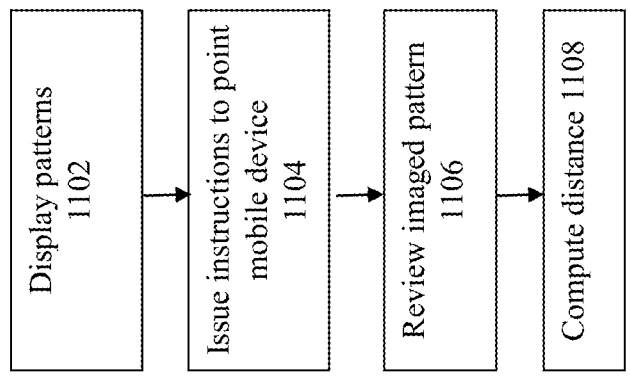

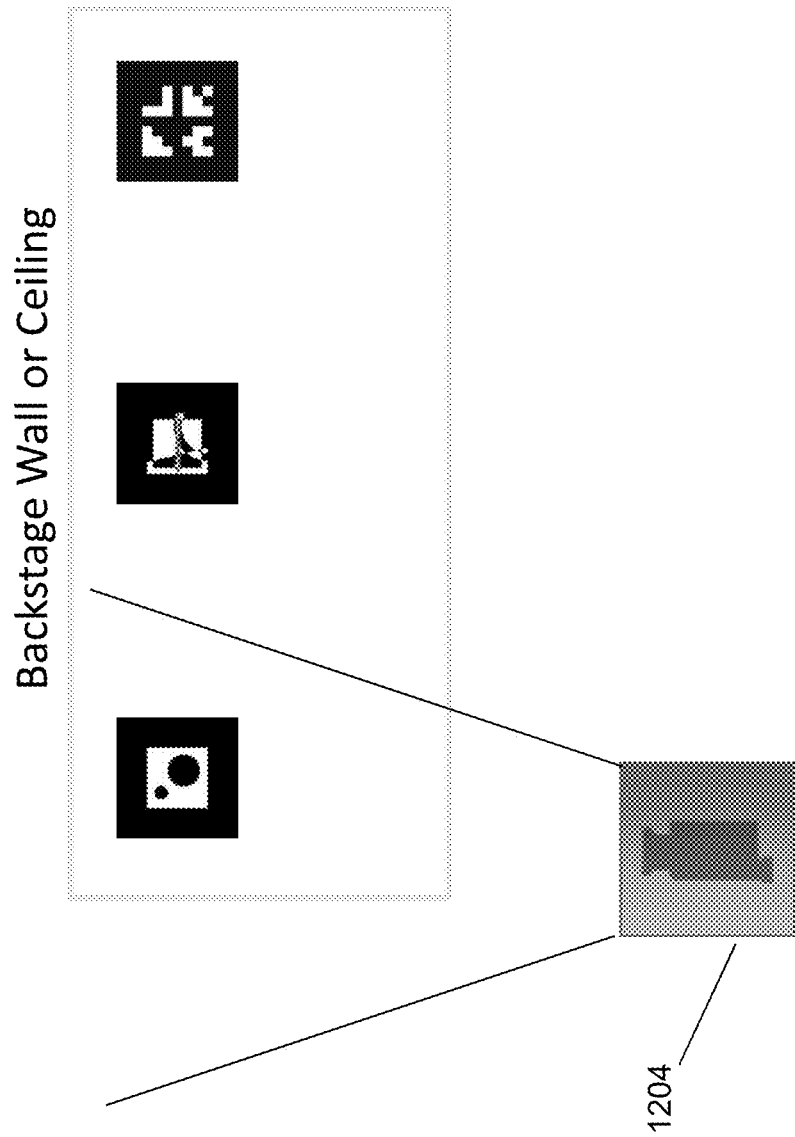

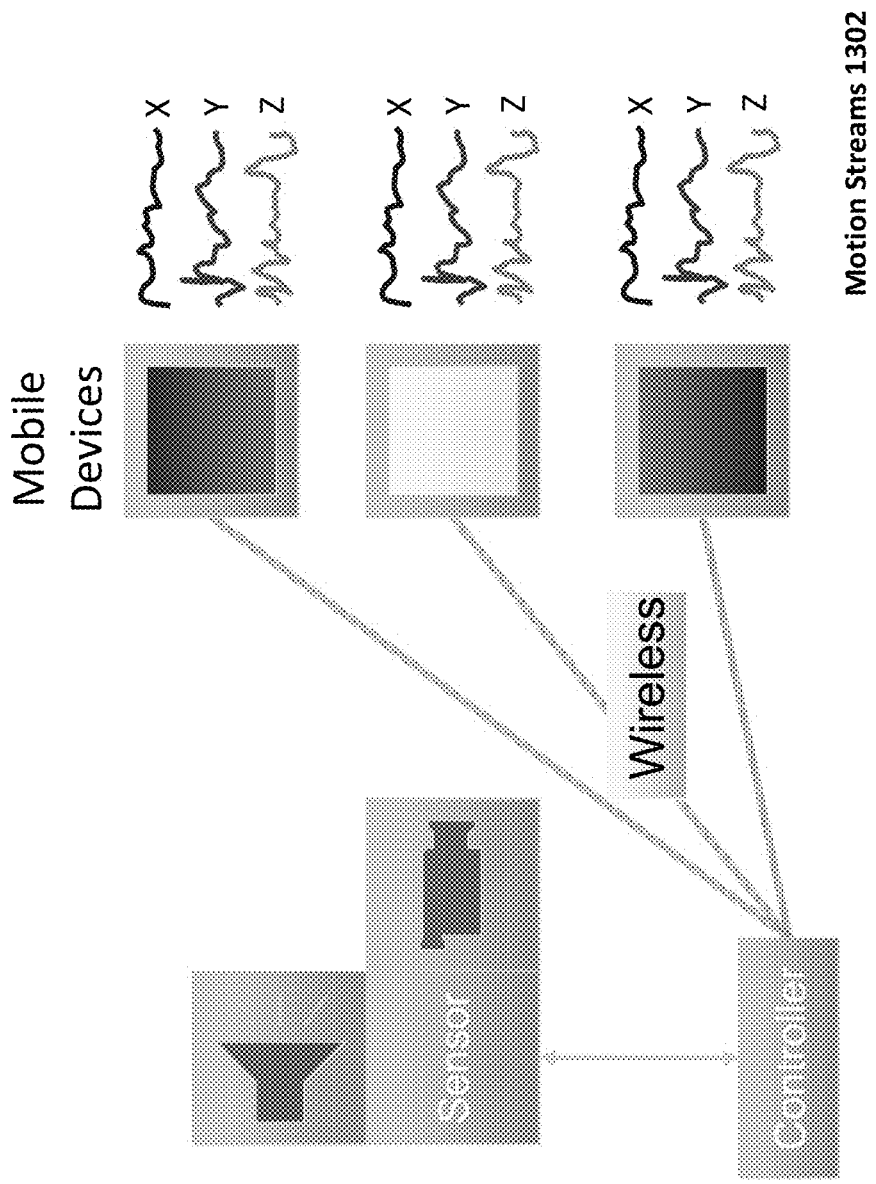

METHOD AND MECHANISM FOR PERFORMING CLOUD IMAGE DISPLAY AND CAPTURE WITH MOBILE DEVICES

CROSS REFERENCE TO RELATED APPLICATIONS

The present application claims the benefit of U.S. Provisional Application 61/332,522 and U.S. Provisional Application 61/332,490, both filed on May 7, 2010, which are hereby incorporated by reference in their entirety. The present application is related to co-pending U.S. application Ser. No. 13/102,794, titled "METHOD AND MECHANISM FOR COORDINATED CAPTURE AND ORGANIZATION OF MULTIMEDIA DATA", which was filed on even date herewith and which is hereby incorporated by reference in its entirety.

FIELD OF THE INVENTION

The present invention is directed to a new model of participatory interaction that can be implemented at events using mobile devices.

BACKGROUND OF THE INVENTION

Many events are held every day for which there is a desire on the part of both the event organizers and the event spectators to allow the spectators to have a more interactive role at the event. Such events include, for example, performance events and sporting events. These types of events are often very well attended by spectators who are passionate about the event, and who would most likely wish to become a part of the event in some way.

Conventionally, there are very few ways to safely and efficiently allow such spectator interactions. One model of interaction that is known is to provide a crowd at sporting event with colored placards to be held by individual audience members at designated seat locations. At designated moments, these audience members would hold up the placards, and a coordinated spread of the colors among the audience would allow the combination of the placards to form images or words in the audience. However, the distinct drawback with this approach is that the images or messages to be displayed in this manner must necessarily be very static in nature. In addition, a significant amount of planning and coordination must occur for even the simplest of displayed images/messages to be made in this manner. Moreover, this type of interaction cannot be adjusted "on the fly" to correct or re-form a display if something occurs to cause some or all of the placards to be misplaced or not placed.

Another type of audience interaction that is often seen at sporting events is for a crowd to perform the "wave", which is a somewhat coordinated movement of individual sections of the audience to stand up and sit down in synchronism. The effect of this coordinated movement is that it provides for a visual wave-like movement of audience members to spread across the audience. This type of interaction, however, provides only a single type of visual result to be displayed to and by the audience. Moreover, this type of interaction may not be possible for audience members who are not physically capable of the standing and sitting actions that is required for this activity.

Another type of audience interaction that is common at musical concert events is for audience members to hold up a flame-based lighter device. When many audience members engage in this activity at the same time in a darkened music venue, the resultant display of lights often forms a pleasing visual appearance within the crowd. The attractiveness of this type of display is further enhanced when the audience members move or sway in synchronization to the music as they hold the flame-based lighters aloft. The obvious drawback with this type of interaction is the danger of allowing many audience members to use and wave around devices that produce open flames, especially when this activity is occurring in a crowed space.

Therefore, there is a need for an improved approach to implementing participatory interaction by audience members at an event. The improved approach should be safe and effective. The improved approach should also allow for dynamic interactions that can change over time.

SUMMARY

The present invention provides an improved approach for implementing participatory interaction at events using mobile devices. Some embodiments of the invention are directed to an approach for utilizing distributed display screens of mobile devices in an audience to display a much larger collective image. Another embodiment is directed to an approach for utilizing the distributed cameras of mobile devices in an audience to form a massive capture device from the different locations and perspectives of the audience members. Yet another embodiment of the invention is directed to the use of mobile devices in the audience to capture motion events among the audience, which are then used to synthesize new media items and types for the event.

Other objects, features, and advantages of the invention are described in the detailed description, figures, and claims.

BRIEF DESCRIPTION OF THE DRAWINGS

The drawings illustrate the design and utility of embodiments of the present invention, in which similar elements are referred to by common reference numerals. In order to better appreciate the advantages and objects of a preferred embodiment, reference should be made to the accompanying drawings that illustrate this preferred embodiment. However, the drawings depict only one embodiment of the invention, and should not be taken as limiting its scope.

FIG. 1 shows an example event location having multiple mobile devices.

FIGS. 2A-B illustrate a cloud display.

FIG. 9 shows a flowchart of an approach for determining a distance location for a mobile device.

FIG. 10 illustrates an image based approach for determining a location for a mobile device.

FIG. 11 shows a flowchart of an image-based approach for determining a location for a mobile device.

FIGS. 12A-B illustrate an approach for determining the orientation of a mobile device.

FIG. 13 illustrates cloud motion.

DETAILED DESCRIPTION

The present invention provides an improved approach for implementing participatory interaction that can be implemented at events using mobile devices. Such mobile devices include, for example, mobile telephones, smartphones, and other network-capable mobile apparatuses such as WiFi enabled cameras and display devices. Conventionally, these mobile devices are completely independent from the control or even access by the production crew for the event. Therefore, there are no known existing approaches that allow these mobiles devices to be used in a coordinated participatory manner at the event.

Embodiments of the present invention provide a method and mechanism for utilizing mobile devices carried by audience members at an event to provide participatory interaction for those audience members. To illustrate, consider the example event location 100 shown in FIG. 1, which includes a central event staging area 102. In general, the staging area 102 comprises a focal location for the attention of the audience members during the event. For a musical or theatrical event, the staging area 102 may be an actual stage upon which the musicians, performers, and/or their instruments are placed. For a sporting event, the staging area 102 may be the field upon which the athletes conduct an athletic competition. The staging area 102 may include a large display screen upon which images or videos are displayed during the event, e.g., to show replays during a sporting event or videos/pictures during a musical concert event.

Audience members may choose to bring a mobile device into the event location 100. These mobile devices are shown in FIG. 1 as devices 140a-o. According to some embodiments, each of these devices comprises a mobile platform that is capable of communication with a central server at the event location, e.g., over a WiFi network or through a cellular communications network.

Figure 2B:
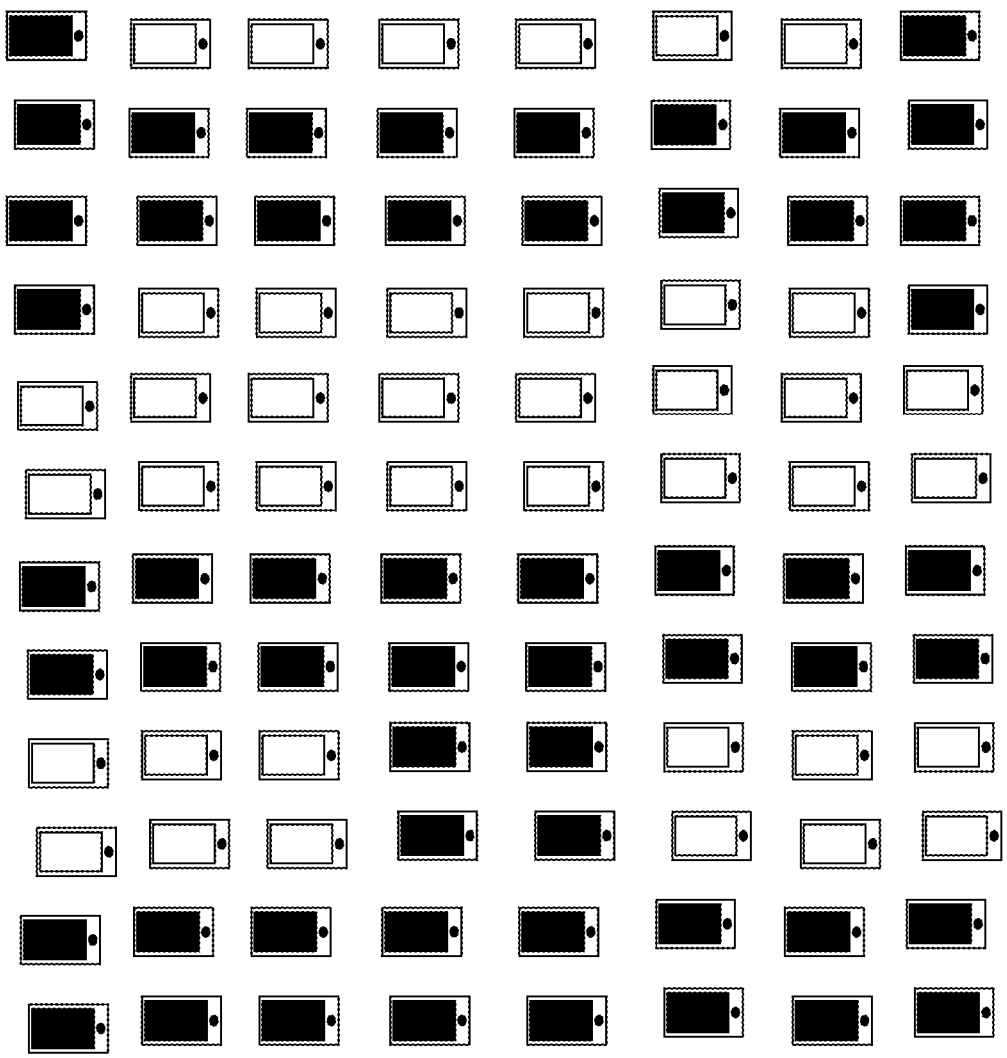

According to a first embodiment of the invention, a large number of the mobile devices in the audience are organized and coordinated such that an image can be collectively displayed by the using the distributed mobile devices. This embodiment operates by operating the distributed mobile devices to each be an individual "pixel" of a larger display. To explain, consider if the audience members, all at the same time, held up their mobile devices with the display portion of those devices facing the stage at the event location. From the perspective of the stage in looking at all those mobile devices, the distribution of the display screens for the mobile devices may appear as shown in FIG. 2A. In effect, the totality of the mobile devices forms a very large display device, where each individual mobile device can fulfill a role as a specific pixel for that very large display device. By assigning certain of the mobile devices to display images or colors on their display screens, thereby assigning a pixel value to those mobile devices, an image can be formed over those collective mobile devices. For example, as shown in FIG. 2B, the array of mobile devices can be configured to display the word "HI" by controlling certain of the mobile devices to display a dark screen while other so the mobile devices are instructed to display a light screen.

As used herein, the term "cloud display" refers to this approach of utilizing the distributed display screens for the mobile devices in an audience to display a much larger collective image. The cloud display is therefore one possible way for members of the audience to directly participate in the event itself, merely by allowing his/her mobile device to be integrated into the collective image display.

As is evident to those of ordinary skill in the art, the individual mobile devices may be controlled to display any pattern and/or color, such that the overall collective display may be used to show any arbitrary image using the mobile devices. Therefore, the image display is dynamic in nature, since the collective image can be easily changed by merely reassigning the pixel values to be displayed by the individual mobile devices.

According to a second embodiment of the invention, the mobile devices in the audience are organized as a massive media capture device to capture media data for the event. At the event location, each of the participating mobile devices may comprise a data capture device that is capable of capturing one or more types of image data or other type of information at the event location. Any type of data capture device may be used to capture any type of data for the event. For example, the data capture devices may be used to capture video, pictures, audio, speech, and text. Such data capture devices may include video cameras, still photography cameras, sound microphones, and sound capture devices for musical instruments.

Figure 3:
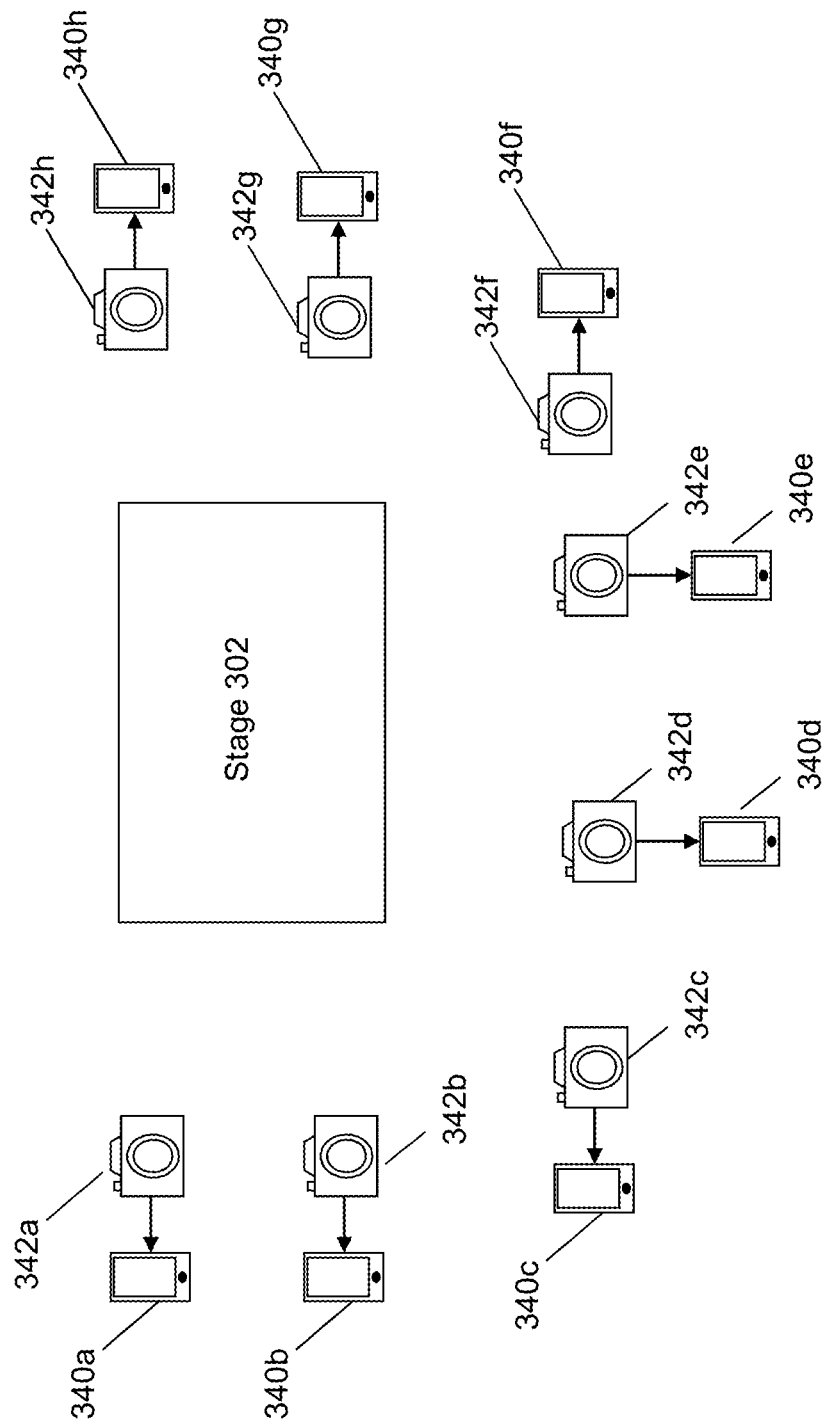
FIG. 3 illustrates a cloud camera.

According to one embodiment, it is contemplated that the data capture device comprises the digital camera that is built into a mobile telephone held by an audience member at the event. This embodiment is shown in FIG. 3, in which the event is attended by audience members that possess mobile devices 340a-h that are associated with cameras 342a-h. Each of the cameras 342a-h captures images or videos of the event location, and particularly of the event stage 302. The captured images are therefore from many different locations and viewing perspectives within the event location. The captured images may then be used to generate or render new images or media types.

As used herein, the term "cloud camera" refers to this approach of utilizing the distributed cameras or capture devices from the mobile devices in an audience to form a massive capture device from the different locations and perspectives of the audience members. The cloud camera is therefore another possible way to use the invention to allow members of the audience to participate in the event.

According to a third embodiment of the invention, the mobile devices in the audience are organized to capture motion events among the audience. The motion events may then be used to synthesize new media items and types for the event. As used herein, the term "cloud motion" refers to this approach of utilizing the distributed mobile devices in an audience to capture motion data, and to use that motion data to render new media items.

Figure 4:
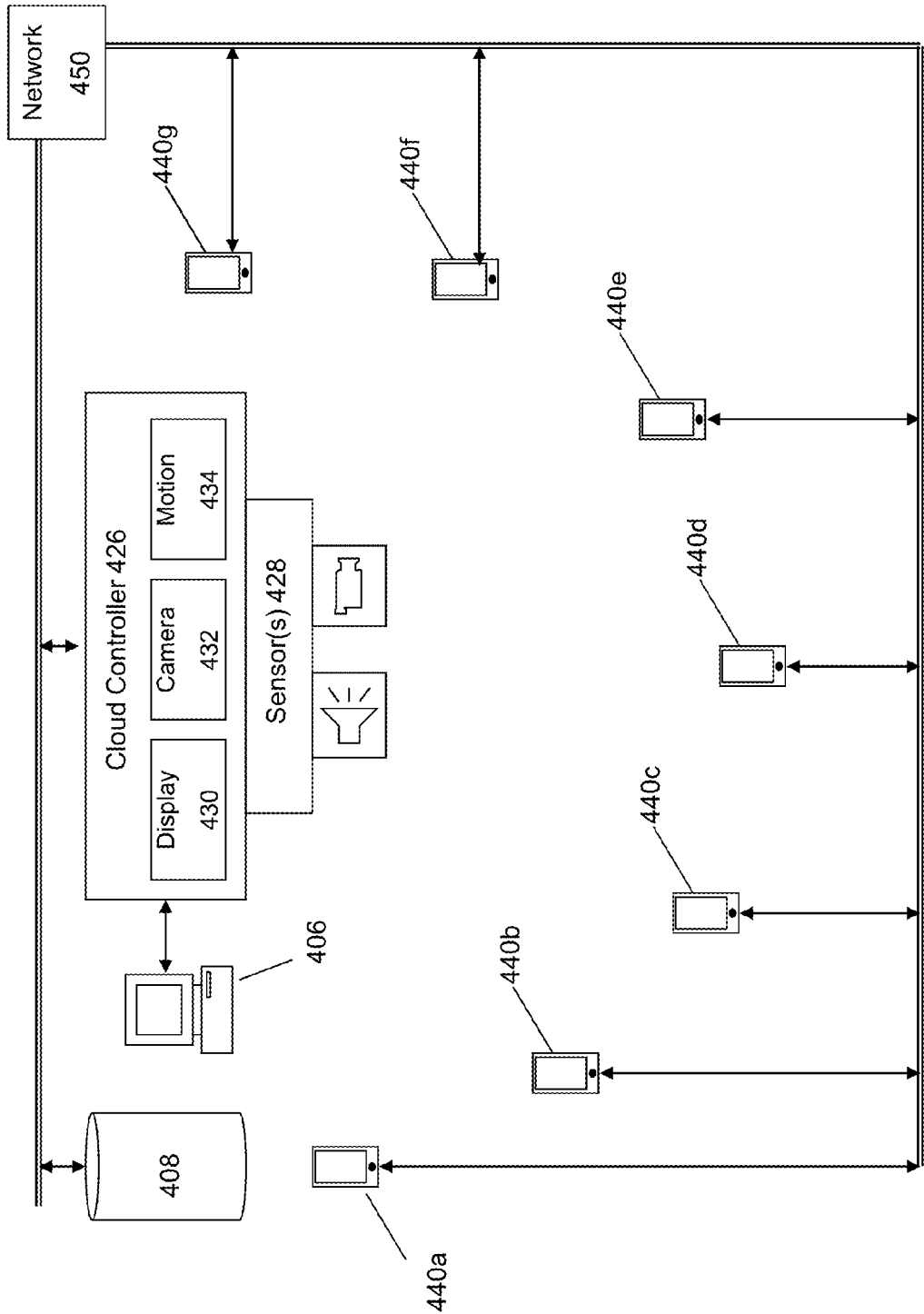
FIG. 4 shows an example system embodying one or more embodiments of the invention.

FIG. 4 illustrates a system for providing mobile device interaction at an event according to some embodiments of the invention. The system comprises multiple mobile devices 440a-g which are capable of interacting with network 450. The mobile devices 440a-g may be any device or mechanism that is suitable for displaying and/or recording multimedia data, such as a mobile telephone, smartphone, network-capable video camera, network-capable still camera, network-capable audio recording device, or a device that integrates some or all of these functions.

A cloud controller 426 is employed to control the cloud-based operations of the system. Cloud controller 426 comprises a module 430 to perform cloud display functionality, a module 432 to perform cloud camera functionality, and/or a module 434 to perform cloud motion functionality. The system, cloud controller 426, and/or its components may be controlled or accessed by one or more users at one or more user stations 406 that operate the system. The user station 406 and/or any of the components controlled by the user station 406, such as the cloud controller 426, comprises any type of computing station that may be used to operate, interface with the system. Examples of such user stations 406 include for example, workstations, personal computers, or remote computing terminals. User station 406 comprises a display device and/or audio device, such as a display monitor and speakers, for displaying or playing back recorded data to users at the user station 406. User station 406 also comprises one or more input devices for the user to provide operational control over the activities of system, such as a mouse or keyboard to manipulate a pointing object in a graphical user interface.

The cloud controller 426 utilizes one or more sensors 428, e.g., to perform calibrations functions with respect to mobile devices 440a-g. The term "sensor" in this context generally refers to a device that may be used to either generate or detect a signal to/from the mobile devices 440a-g. For example, with respect to audio signals in a first direction, sensor 428 may comprise an audio speaker to generate an audio signal to be detected by microphones at mobile devices 440a-g. Alternatively, sensor 428 may comprise a microphone to detect audio signals emitted by any of the mobile devices 440a-g. With respect to visual signals, sensor 428 may comprise a camera to detect images or image patterns emitted by the mobile devices 440a-g. In the other direction, sensor 428 comprises a display device to generate images or image patterns to be captured by image capture devices at the mobile devices 440a-g.

Information to and/or from the mobile devices 440a-g is sent across network 450. The network 450 may be implemented using any suitable networking framework. For example, a local WiFi network may be established at the event location, which is accessed by mobile devices 440a-g. The mobile devices 440a-g may also communicate with other components in the system using a cellular network.

When used in cloud camera or cloud motion modes, motion or image data captured by the mobile devices 440a-g are generally sent across the network 450 to be stored as parameterized data in storage device 408. Instructions for the mobile devices 440a-g to display images in cloud display mode may be sent from the cloud controller 426 to the mobile devices 440a-g across network 450.

The data storage device 408 may be implemented as any combination of hardware and software that allows for ready access to the data that is located at the data storage device 408. For example, the data storage device 408 could be implemented as computer memory operatively managed by an operating system. The data storage device 408 could also be implemented as an electronic database system having storage on persistent and/or non-persistent storage.

Figure 5:
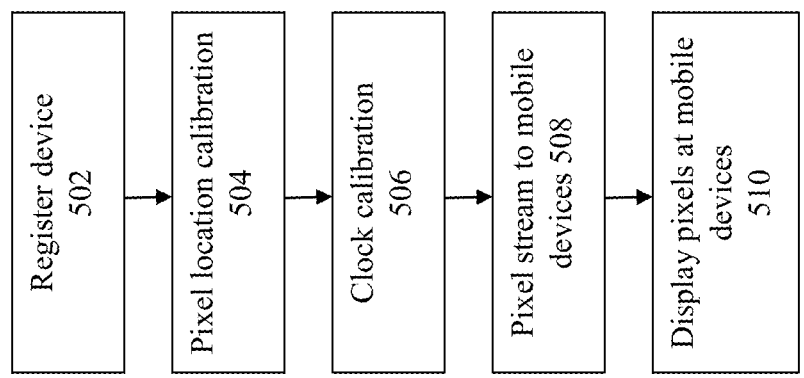
FIG. 5 shows a flowchart of an approach for implementing a cloud display.

FIG. 5 shows a flowchart of an approach for implementing the cloud display functionality. At 502, a mobile device is registered with the system. For example, at each event location, the local WiFi server would broadcast a signal indicating the availability for participating at the event. When the user of a WiFi-enabled mobile device has a desire to participate in the event interaction, the mobile device will be commanded to search for any nearby WiFi networks that are associated with the event, where the signal for the event may be identified by the mobile device. The central server would establish a connection to the mobile device and set up unique identification protocols so that the mobile device can be uniquely referenced and identified among the other registered mobile devices, and so that any data captured by the mobile device can readily be identified and associated with that specific device.

At 504, pixel calibration is performed to identify the pixel coordinate of the mobile device relative to a coordinate system maintained by the cloud controller. As described in more detail below, this action is performed to identify the location (e.g., an (x,y) coordinate) for the mobile device.

Clock calibration is performed at 506 to synchronize the mobile device to a common clock. This action is used to make sure all devices in the system are configured to share a common time base.

At 508, a pixel stream is sent to the mobile devices in the system. The pixel stream comprises an image that has been decomposed into its constituent pixel values, where the pixel values are specific to certain pixels and their mobile devices in the system. In effect, an image is divided into multiple display portions corresponding to X and Y coordinates on a display device. Each portion is represented as one or more pixels for the image, with a requisite display property for a pixel. The X,Y coordinate is matched up against a specific mobile device among the array of participating mobile devices to identify which device corresponds to that X,Y coordinate. That identified mobile device therefore receives the pixel data to be displayed for that X,Y coordinate.

At a designated time, at 510, the mobile devices are instructed to display the pixel data that has been assigned to that mobile device. The coordinated display of the pixel data by the participating mobile devices results in a display of an image by the collective group of mobile devices.

To enable this collective display, the mobile devices need to be facing the same direction at the same time. At the appropriate time, an instruction is provided to the user of the mobile device to hold the mobile device in the same direction as the other mobile devices. For example, a text message can be sent to the mobile device to instruct the user to point the display portion of the mobile device at the stage at a given point in time.

Figure 6:
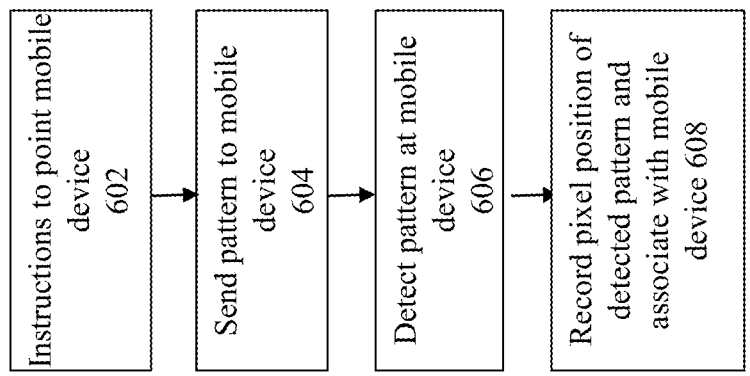
FIG. 6 shows a flowchart of an approach for performing pixel synchronization.

FIG. 6 illustrates a flowchart of an approach for implementing pixel location calibration according to an embodiment of the invention. This technique is used to provide a spatial location for the mobile device in the system. At 602 instructions are sent to the mobile device to point the mobile device at the location of the controller sensor device, e.g., at the event stage. For example, a text message can be sent to the mobile device to instruct the user to point the display portion of the mobile device at the stage at a given point in time.

At 604, the controller sends a unique display pattern to the mobile device. The unique display pattern comprises any combination of display attributes that can be generated by a mobile device and detected by the sensor at the controller. For example, the display pattern may have a flashing light pattern or frequency that differs from the light pattern or frequency assigned to another mobile device.

The mobile device is instructed to display the unique pattern on its display screen. At 606, the camera sensor at the controller will generate image data from the audience in an attempt to detect the unique pattern. This action is performed by analyzing the frames of the collected image data from the camera sensor to check for the unique display pattern. Once the pattern has been identified, the location of that pattern location in the image frame corresponds exactly to the location of the mobile device. That location in the image frame is then translated to the X,Y coordinate for the system, which maps to a particular pixel of the overall cloud display encompassing all of the participating mobile devices.

At 608, that pixel location is recorded for the mobile device. When there is a desire to generate an image on the cloud display, pixel values are generated for the individual pixels of the image. The pixel value for the specific pixel corresponding to the mobile device would be automatically routed to that mobile device for display.

Figure 7:
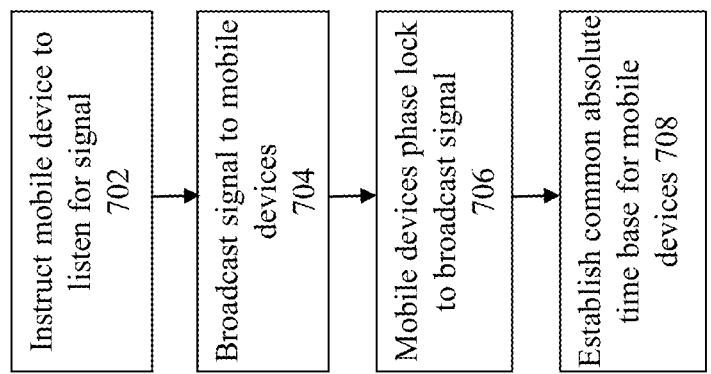
FIG. 7 shows a flowchart of an approach for performing clock synchronization.

FIG. 7 illustrates a flowchart of an approach for performing clock calibration according to an embodiment of the invention. This technique uses audio signals to synchronize a mobile device to a common clock shared by all devices in the system. At 702 instructions are sent to the mobile device to begin detection of an audio signal from the cloud controller sensor device. For example, an instruction can be sent to the mobile device to turn on its microphone and begin sampling audio signals at a given frequency range.

Next, at 704, the cloud controller sensor device will begin broadcasting an audio signal to the mobile devices. According to one embodiment, the sensor device is an audio system that generates an ultrasonic audio signal, where the signal comprises a 50-100 KHz sine wave signal.

The mobile device is instructed to use its microphone to detect this audio signal. Once detected, the mobile device is instructed at 706 to phase lock its local clock to the broadcast signal. The mobile device performs this action by adding or subtracting from its local time base to "lock" to the incoming audio signal.

At 708, the controller establishes a common absolute time base for all of the devices in the system. According to one embodiment, the NTP (Network Time Protocol) approach is employed to establish the absolute time for the system. The absolute time can be to a local controller clock or to an atomic clock. The exact clock that provides the common time does not matter, so long as all the devices in the system are agreed to a common clock.

This document will now describe an inventive approach to interactively implement a cloud camera using mobile devices at an event. Known techniques exist to use the output of multiple discrete imaging devices to generate images that would otherwise require a much larger imaging device or to render images that would otherwise not be possible from a single imaging device. For example, the technique of aperture synthesis is used in the astronomy field to effectively form a single large telescope lens from the coordinated interactions of multiple smaller telescope lenses. In the field of camera imaging, multiple coordinated cameras are often used to render three-dimensional images, based upon viewing an object from multiple image angles.

However, the known techniques for using multiple imaging devices all require that the imaging devices be pre-installed into known locations. In fact, systems that utilize these multi-camera techniques are often required to use specialized brackets or other apparatuses to ensure that the imaging devices are "fixed" in a specific known position relative to other imaging devices or to the object being imaged (such as described in U.S. Pat. No. 7,542,073). Therefore, these known approaches cannot be effectively used to handle multiple imaging devices at an event location where it is possible that the individual mobile devices will be located in unstructured and arbitrary locations within the event venue. The problem is further exacerbated in the event context by the possibility that the users carrying the mobile devices may move from one position to another within the event venue.

The present invention is capable of utilizing and integrating imaging data taken by multiple mobile devices at an event location, even if the mobile devices are not rigidly pre-installed into known locations at the event venue. According to some embodiments, calibration methodologies are employed to synchronize and coordinate the participation of the mobile devices in the system. The imaging data gathered by the mobile devices are stored with sufficient information to allow the data from separate devices to be reliably and coherently integrated together.

Figure 8:
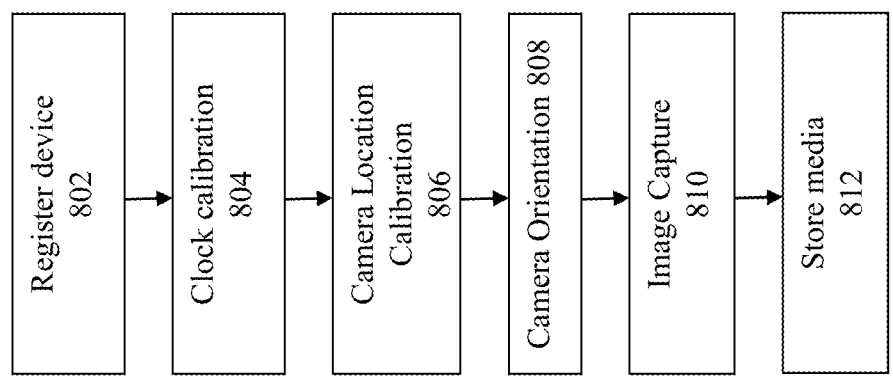
FIG. 8 shows a flowchart of an approach for implementing a cloud camera.

FIG. 8 shows a flowchart of an approach for implementing a cloud camera using multiple mobile devices at an event. At 802, a mobile device is registered with the system. As previously explained, a local WiFi server could be used to broadcast a signal indicating the availability for participating at the event, and when the user of a WiFi-enabled mobile device has a desire to participate in the event interaction, the mobile device will be commanded to search for any nearby WiFi networks that are associated with the event. The mobile device would link into the network and establish a connection to a central server so that the mobile device can be uniquely referenced and identified among the other registered mobile devices, and so that any data captured by the mobile device can readily be identified and associated with that specific device.

At 804, clock calibration is performed to synchronize the mobile device to a common clock and to make sure that all devices in the system are configured to share a common time base. The approach described in FIG. 7 shows one possible way to perform clock calibration.

Camera location calibration is performed at 806 to establish the location of the mobile device within the event venue. Unlike the cloud display application described above which only requires an (X,Y) coordinate for the mobile device location, the cloud camera application also requires the distance (or "Z" coordinate) from the mobile device to the controller location (or other selected origin point in the venue location). Techniques for determining the position of a mobile device are described in further detail below.

The camera orientation is determined at 808, which identifies the direction at which the camera on the mobile device is pointing. At 810, the mobile device captures photographs, videos, or other imaging data, and stores the captured media at 812.

The captured data from the cloud camera can be used for any suitable purpose. For example, the captured data can be used to form real-time displays of images at a large screen at the event. The captured data may also be used to render images or videos, e.g., to form three-dimensional images of the event.

According to one embodiment, the data captured by the mobile device comprises both raw data and metadata. The raw data corresponds to the underlying media files/data captured by the mobile devices. The metadata comprises information that establishes coherency of the data relative to other data being recorded for the event. Such data includes, for example, information relating to data and the circumstances surrounding the capture of the data. One type of metadata that can be associated with the raw data is the location and orientation of the mobile device that was used to capture the raw data. The metadata may also include synchronized clock data that identifies the time period at which the raw data was captured. The metadata may also include identification information relating to the live broadcast at certain points in time. For example, at a music concert, the metadata may be used to identify the particular song that is being played during a given time period, and hence the song that corresponds to a given set of data recordings. This type of metadata permits easier classification and later querying of the recorded data as they pertain to certain subjects at the event. One possible approach for implementing the storage formats, database, and storage configuration for the captured data is described in co-pending U.S. application Ser. No. 13/102,794, entitled "METHOD AND MECHANISM FOR COORDINATED CAPTURE AND ORGANIZATION OF MULTIMEDIA DATA", which is hereby incorporated by reference in its entirety.

Since the data is being captured from multiple independent mobile devices, synchronization is required to make sure the mobile devices are capturing and recording the data in a consistent manner, so that the captured data can be coherently integrated or otherwise combined together. The synchronization actions are performed to ensure that the devices in the system are calibrated with respect to two properties: (1) spatial positioning; and (2) time. This is the reason for performing the actions of camera location calibration and clock synchronization.

There are several possible approaches that can be taken to identify the location of the mobile devices. For example, many mobile telephones now incorporate a GPS mechanism that allows calculation of the exact location coordinate for the telephone. The drawback with existing GPS technologies is the coordinate provided by the GPS system is typically not very precise, and indeed can only provide an approximate location that is unacceptable for imaging purposes.

The pixel location calibration approach described above with reference to FIG. 6 provides one approach for precisely determining the (X,Y) coordinate of a mobile device within an event venue using audio sensors. That approach can be supplemented by the approach of FIG. 9 to determine the distance (or "Z" coordinate) of the mobile device. This approach relies upon a previously performed action at 900 to synchronize the mobile device and the controller to a common time base, e.g., using the approach described in FIG. 7. Next, at 902, the mobile device is instructed to listen for an audio signal at a specified trigger time. At 904, at that specified trigger time, the controller will generate the audio signal, which will be broadcast into the event venue.

The mobile device has already been instructed to use its microphone to listen for the audio signal. Upon detection of the audio signal, at 906, the mobile device will record the exact time which the signal was received. The difference between the receipt time at the mobile and the broadcast time from the controller is the transmission time for the sound of the audio signal to reach from the controller to the mobile device. Based upon the known speed of sound, the distance from the controller to the mobile device can then be determined at 908.

FIG. 10 illustrates an alternative approach for determining the location of a mobile device using an imaging technique based upon an "augmented reality" algorithm. This approach generally operates by displaying one or more calibration images at a central location, and using the mobile devices to capture a picture of the calibration images. For example, FIG. 10 shows three calibration images 1002, 1004, and 1006. Each of the calibration images include elements of a given size and position within the image. Image 1002 is spaced a distance a away from image 1004, and image 1004 is spaced a distance of b away from image 1006, where distances a and b are equal.

In this example, it is desired to determine the location of mobile device cameras 1008, 1010, and 1012. Each of the mobile device cameras 1008, 1010, and 1012 would capture one or more image frames of the calibration images. Analysis of the size, position, and/or orientation of the calibration images in the image frame would provide the location of the mobile device camera that captured the image frame.

For example, the measured distances a and b provides an indication of the location of the mobile device cameras, where a smaller value for these distances in the image frame indicates that the mobile device camera is farther from the stage, and a larger value for these distances indicates that the mobile device camera is closer to the stage.

The relative values of the a and b distances in the picture provides an indication of whether the mobile device camera is to the left, right, or centered before the stage. If the distance a is smaller than the distance b in the picture, then the mobile device camera is towards the left side of the stage. If the distance a is larger than the distance b in the picture, then the mobile device camera is towards the right side of the stage. If the distance a is exactly the same as the distance b in the picture, then the mobile device camera is centered before the stage. The exact differential between these two values, along with the distance to the stage, can be used to calculate the X,Y coordinate of the mobile device.

Similar analysis can be performed by using the relative size, position, and orientation of the specific elements within the calibration images themselves that appear in an image frame. For example, viewing of the calibration images from different angles will cause a corresponding type of image skewing to occur in the captured image frame. Analysis of such image skews permits the controller to identify the exact location of the mobile device.

FIG. 11 shows a flowchart of an approach for performing image-based calibration for the location of the mobile device. At 1102, one or more calibration images are displayed at the stage. The mobile device (or its user) is instructed at 1104 to point the mobile device camera at the stage, and to capture one or more image frames that show the calibration images.

The imaged patterns in the image frame are analyzed, at 1006, using an augmented reality algorithm to compute the relative orientation between the images and the camera. The calibration images (and their constituent image elements) have known visual properties. By analyzing the exact positions, orientations, and sizes of the calibration images and/or image elements in the captured image frames, the exact location of the mobile device can be calculated.

At 1108, the distance to the stage is computed for the mobile device camera. The distance can be computed using triangulation based on the relative orientations that were previously determined, and the known locations of the calibration images relative to each other.

With regard to the orientation of the mobile device, this information can often be based upon the built-in features of the mobile device. For example, some modern mobile telephones now include an accelerometer device that can be used to determine the exact orientation of the mobile device.

However, it is possible that mobile devices will be brought to the event location which do not include an accelerometer, and for which it is desired to determine the orientation of that device. The previously described image analysis can also be used to determine the orientation of the mobile device if necessary.

Figure 12A:
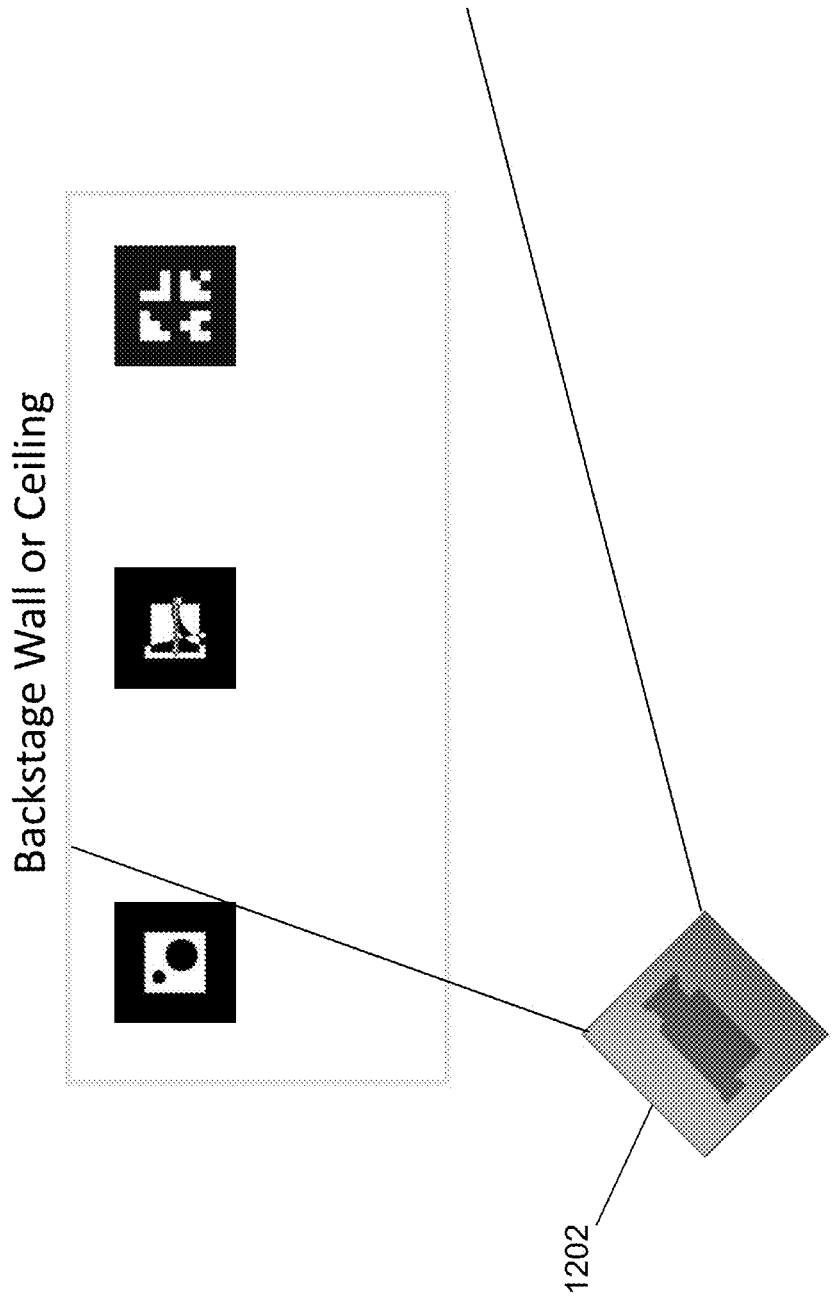

FIGS. 12A and 12B illustrate this approach for determining orientation. Assume that the location of a mobile device camera has already been determined relative to the stage in the event venue. However, the orientation of the mobile device camera has not yet been determined, e.g., the camera 1202 may be facing towards the right side of the stage as shown in FIG. 12A or the camera 1204 may be facing directly forwards as shown in FIG. 12B. The orientation of the camera can be determined by analyzing the pictures captured by that camera. If the camera is facing towards the right side direction as shown in FIG. 12A, then the imaged image frame will show an image indicative that the camera is pointing towards the right side, e.g., because the image frame exclude the leftmost calibration image and shows the center and right calibration images with certain skewed image properties. If the camera is facing directly forwards as shown in FIG. 12B, then the imaged image frame will show an image indicative that the camera is pointing forwards, e.g., because the image frame excludes the rightmost calibration image and may show some skewing of the center calibration image.

The above calibration measures can be taken any time it is necessary to determine the actual location of the mobile devices. In addition, the calibration measures can be at regular intervals and/or before an interaction event to account for possible movements by the mobile devices.

This document will now describe an approach for implementing cloud motion, where the mobile devices are utilized to capture motion events among the audience. The motion events may then be used to synthesize new media items and types for the event.

As shown in FIG. 13, the general idea is that a "motion stream" of data 1302 is captured for the mobile devices, where the motion stream identifies the direction and magnitude of the movements of the mobile devices in the X, Y, and Z directions. That information can be used as parametric motion data and used for many purposes. For example, for visual purposes, each mobile device can be assigned to a pixel or portion of a large display at the event stage, and the motion of the mobile device is used to influence the specific type of image that is presented at that pixel/portion. Colors can be assigned to particular types of movements, and the movement of the mobile device will be reflected in the change of a color for the pixel assigned to that device. As the entire audience moves and sways to a concert, the overall display will show a mosaic of changing colors that expresses and reflects the movements of the audience.

The movement data can also be used to synthesize new items of audio. Certain types and magnitudes of motion could be designated to correspond to certain sound types or frequency ranges, where the audience members can move their mobile devices to generate certain sounds at certain frequency ranges. The sound elements created by the mobile devices can be collected together and played back to the audience, to be modified in real-time as the audience continues to move the devices during the playback.

The cloud motion technique can be used in conjunction with the cloud display technique to provide interactive events for the audience. For example, the cloud display can be used to display the image of a virtual beach ball bouncing around in the audience. Cloud motion can be used to allow the audience members to strike at the virtual beach ball, where the direction and magnitude of the motion for the mobile devices at the point of impact is analyzed to determine the new path of the virtual beach ball.

The cloud motion approach can also be used as a safe way to replicate the desire of audience members to hold lighters or candles aloft at a concert event. Instead, selected ones of the mobile devices can be designated to display a flame on its display screen, with the motion of the mobile device lending motion to the light displays in the audience.

Figure 14:
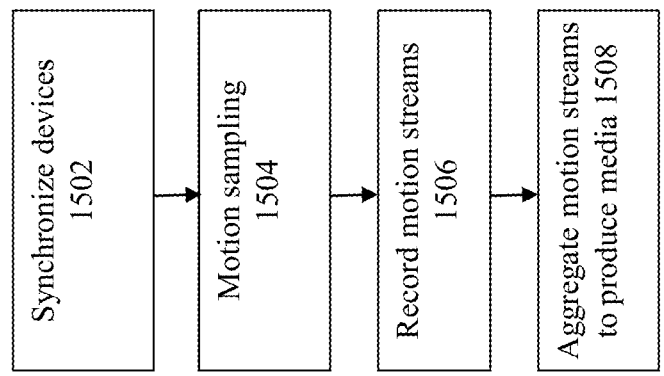
FIG. 14 shows a flowchart of an approach for implementing cloud motion.

FIG. 14 shows a flowchart of an approach for implementing cloud motion according to an embodiment of the invention. At 1502, synchronization is performed to synchronize the clocks and to determine the positions of the mobile devices. The previously described techniques may be performed to implement the desired synchronization actions.

Next, at 1504, the controller instructs the mobile devices to begin sampling motion data at those devices. In one embodiment, the built-in accelerometer in the mobile device is used to sample the device motion. In an alternate embodiment, the camera on the mobile device is used to detect the device motion.

At 1506, the motion streams are recorded, e.g., by sending the motion data streams from the mobile devices to the controller. Thereafter, at 1508, the controller will aggregate the motion streams to produce motion "vector fields" which can then be used to create synthetic images, audio, etc. The motion data in the vector field comprises vectors of (X, Y, Z) movement direction, as well as a magnitude for movement.

Therefore, what has been described is an improved approach for implementing participatory interaction at events using mobile devices. Cloud display is implemented by utilizing the distributed display screens of the mobile devices in an audience to display a much larger collective image. Cloud camera is implemented by utilizing the distributed cameras of mobile devices in an audience to form a massive capture device from the different locations and perspectives of the audience members. Cloud motion is implemented by using the mobile devices in the audience to capture motion events among the audience, which are then used to synthesize new media items and types for the event.

System Architecture Overview

Figure 15:
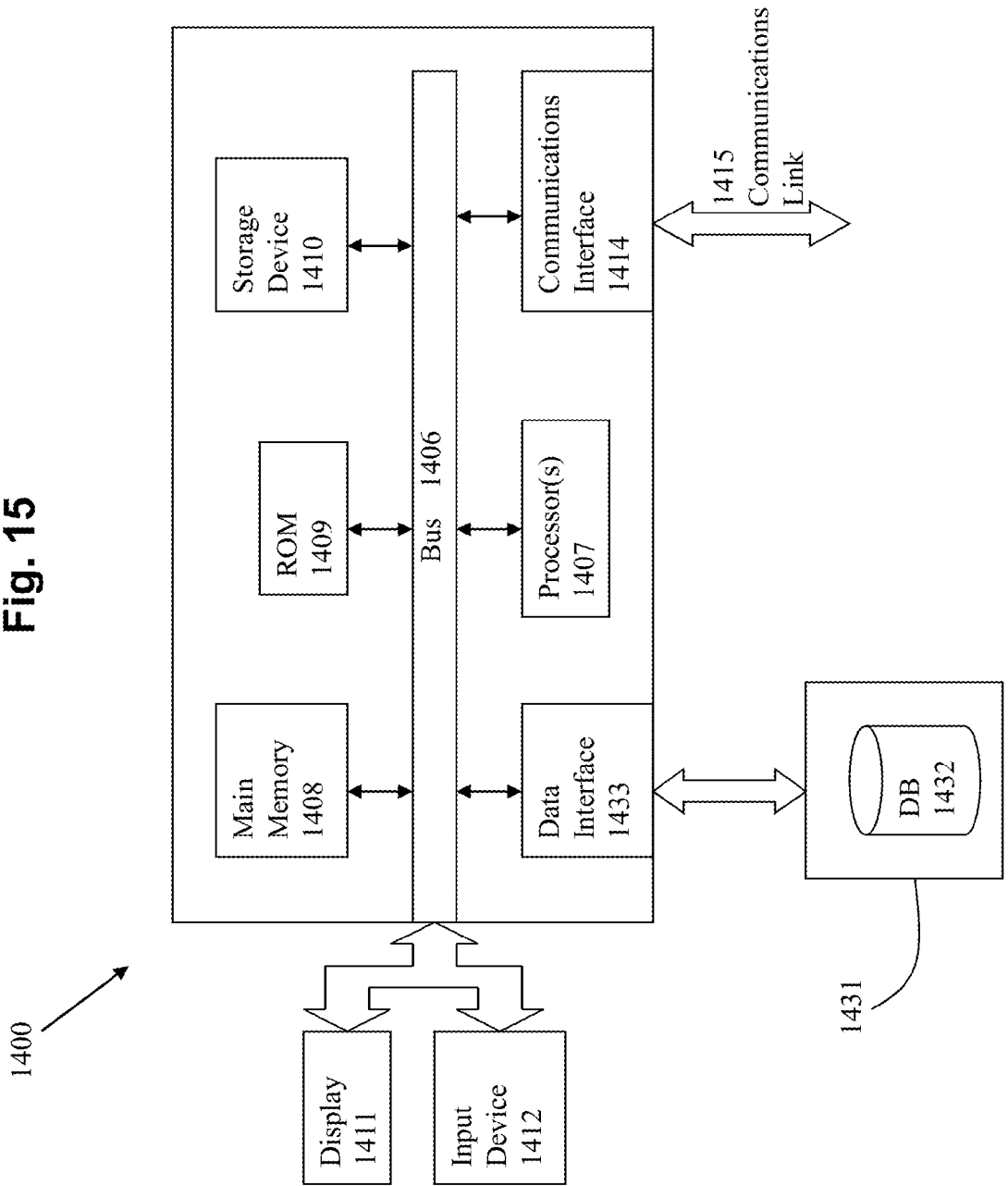
FIG. 15 shows an example computing system with which embodiments of the invention may be implemented.

FIG. 15 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for implementing participation at a spectator event using mobile devices, comprising:
    registering a mobile device at a spectator event;
    synchronizing the mobile device at the spectator event by performing clock calibration to synchronize the mobile device to a common clock shared by devices at the spectator event, wherein the mobile device is clock synchronized by detecting a broadcast signal and phase locking a local clock at the mobile device to the broadcast signal;
    sending participation data to the mobile device; and
    utilizing the participation data at the mobile device to allow the mobile device to participate in the spectator event.

2. The method of claim 1 in which the mobile device participates in the spectator event by sharing captured multimedia data.

3. The method of claim 2 in which the captured multimedia data comprises video, pictures, or sound.

4. The method of claim 3 in which the captured multimedia data is used to render new media types that are shared with other mobile devices.

5. The method of claim 1 in which a location is tracked for the mobile device to facilitate participation by the mobile device.

6. The method of claim 1 in which the mobile device is synchronized for at least one of location and orientation.

7. The method of claim 1 in which the mobile device is a mobile telephone.

8. A computer program product embodied on a non-transitory computer usable medium, computer usable medium having stored thereon a sequence of instructions which, when executed by a processor causes the processor to execute a method for implementing participation at a spectator event using mobile devices, the method comprising:
    registering a mobile device at a spectator event;
    synchronizing the mobile device at the spectator event by performing clock calibration to synchronize the mobile device to a common clock shared by devices at the spectator event, wherein the mobile device is clock synchronized by detecting a broadcast signal and phase locking a local clock at the mobile device to the broadcast signal;
    sending participation data to the mobile device; and
    utilizing the participation data at the mobile device to allow the mobile device to participate in the spectator event.

9. The computer program product of claim 8 in which the mobile device participates in the spectator event by sharing captured multimedia data.

10. The computer program product of claim 9 in which the captured multimedia data is used to render new media types that are shared with other mobile devices.

11. The computer program product of claim 8 in which a location is tracked for the mobile device to facilitate participation by the mobile device.

12. The computer program product of claim 8 in which the mobile device is synchronized for at least one of location and orientation.

13. The computer program product of claim 8 in which the mobile device is a mobile telephone.

14. A system for implementing participation at a spectator event using mobile devices, comprising:
    a processor;
    a memory for holding programmable code; and
    wherein the programmable code includes instructions for registering a mobile device at a spectator event;
    synchronizing the mobile device at the event by performing clock calibration to synchronize the mobile device to a common clock shared by devices at the spectator event, wherein the mobile device is clock synchronized by detecting a broadcast signal and phase locking a local clock at the mobile device to the broadcast signal;
    sending participation data to the mobile device; and
    utilizing the participation data at the mobile device to allow the mobile device to participate in the spectator event.

15. The system of claim 14 in which the mobile device participates in the spectator event by sharing captured multimedia data.

16. The system of claim 15 in which the captured multimedia data is used to render new media types that are shared with other mobile devices.

17. The system of claim 14 in which a location is tracked for the mobile device to facilitate participation by the mobile device.

18. The system of claim 14 in which the mobile device is synchronized for at least one of location and orientation.

* * * * *